(12) United States Patent
Zhang et al.

(10) Patent No.: US 10,884,281 B2
(45) Date of Patent: Jan. 5, 2021

(54) DISPLAY PANEL AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Zhaoke Zhang, Beijing (CN); Bing Wang, Beijing (CN); Gangqi Huang, Beijing (CN)

(73) Assignees: HEFEI BOE TECHNOLOGY OPTOELECTRONICS CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 4 days.

(21) Appl. No.: 16/327,916

(22) PCT Filed: May 29, 2018

(86) PCT No.: PCT/CN2018/088791
§ 371 (c)(1),
(2) Date: Feb. 25, 2019

(87) PCT Pub. No.: WO2019/001202
PCT Pub. Date: Jan. 3, 2019

(65) Prior Publication Data
US 2019/0219864 A1 Jul. 18, 2019

(30) Foreign Application Priority Data
Jun. 26, 2017 (CN) .......................... 2017 1 0496647

(51) Int. Cl.
G02F 1/1335 (2006.01)
G02F 1/13357 (2006.01)
G02F 1/1333 (2006.01)

(52) U.S. Cl.
CPC .. *G02F 1/133512* (2013.01); *G02F 1/133526* (2013.01); *G02F 1/133606* (2013.01);
(Continued)

(58) Field of Classification Search
CPC ... G02F 1/133512; G02F 2001/133388; G02F 1/1339
See application file for complete search history.

(56) References Cited

U.S. PATENT DOCUMENTS

| 5,844,644 A | 12/1998 | Oh et al. |
| 2005/0174524 A1 | 8/2005 | Yuh et al. |

(Continued)

FOREIGN PATENT DOCUMENTS

| CN | 101201512 A | 6/2008 |
| CN | 101526708 A | 9/2009 |

(Continued)

OTHER PUBLICATIONS

First Office Action for Chinese Patent Application No. 201710496647.1 dated Jun. 20, 2019.
(Continued)

*Primary Examiner* — Jessica M Merlin
(74) *Attorney, Agent, or Firm* — Calfee, Halter & Griswold LLP

(57) ABSTRACT

A display panel comprising: a first substrate and a second substrate opposite to each other, a light deflection structure between the first substrate and the second substrate, and a black matrix on a side of the second substrate close to the first substrate. The display panel further comprises a display region and a non-display region. The black matrix comprises a light shielding region and a hollowed-out region in the non-display region. The light deflection structure is configured to deflect part or all of light incident towards the hollowed-out region to the light-shielding region.

20 Claims, 3 Drawing Sheets

(52) U.S. Cl.
CPC ............ *G02F 2001/133388* (2013.01); *G02F 2001/133607* (2013.01)

(56) References Cited

U.S. PATENT DOCUMENTS

| | | |
|---|---|---|
| 2008/0137167 A1 | 6/2008 | Ozawa |
| 2009/0225259 A1 | 9/2009 | Choi |
| 2009/0231524 A1* | 9/2009 | Tanaka .................. G02F 1/1339 349/110 |
| 2015/0223297 A1 | 8/2015 | Sato |
| 2017/0075174 A1* | 3/2017 | Lee ................... G02F 1/133512 |
| 2017/0219872 A1* | 8/2017 | Ibaraki .............. G02F 1/136286 |
| 2017/0299773 A1 | 10/2017 | Guo |
| 2018/0081238 A1 | 3/2018 | Tian et al. |
| 2019/0219864 A1 | 7/2019 | Zhang et al. |

FOREIGN PATENT DOCUMENTS

| | | |
|---|---|---|
| CN | 102736315 A | 10/2012 |
| CN | 103413495 A | 11/2013 |
| CN | 104821139 A | 8/2015 |
| CN | 105093652 A | 11/2015 |
| CN | 106154633 A | 11/2016 |
| CN | 106249464 A | 12/2016 |
| CN | 107092126 A | 8/2017 |
| JP | H08050283 A | 2/1996 |
| KR | 20090106062 A | 10/2009 |
| TW | 200305749 A | 11/2003 |

OTHER PUBLICATIONS

Search Report and Written Opinion for International Application No. PCT/CN2018/088791 dated Oct. 24, 2018.

\* cited by examiner

DISPLAY PANEL AND DISPLAY DEVICE

CROSS REFERENCE TO RELATED APPLICATION(S)

This application is the U.S. national phase entry of PCT Application No. PCT/CN2018/088791, filed May 29, 2018, which is based upon and claims priority to Chinese patent application No. 201710496647.1 filed on Jun. 26, 2017, the entire disclosure of which is incorporated herein by reference.

TECHNICAL FIELD

The present disclosure relates to the field of display technologies, and specifically discloses a display panel and a display device.

BACKGROUND ART

With the development of thin film transistor liquid crystal display technologies and the progress in industrial technologies, the production costs of liquid crystal display devices are increasingly reduced and the manufacture process thereof is increasingly improved. Due to characteristics such as high response speed, high contrast and colorfulness, thin film transistor liquid crystal displays have become a mainstream technique in the field of flat panel displays.

Generally, a liquid crystal display panel comprises: an array substrate, a counter substrate, and liquid crystal molecules arranged between the array substrate and the counter substrate. In addition, a black matrix is further provided in a non-display region of the counter substrate, so as to prevent light leakage. Typically, a plurality of signal lines, e.g., gate lines, crossing each other transversely and longitudinally, are arranged in the non-display region of the array substrate. During operation of the display panel, an induced electric field on the gate line will generate induced charges on the black matrix. Such induced charges will move towards the display region and be apt to form a parasitic electric field together with pixel electrodes in the display region. This results in a disturbance of the electric field and a whitish perimeter of the display panel.

In order to reduce the whitish perimeter phenomenon, the black matrix close to the display region is usually slotted. However, slotting the black matrix may result in light leakage, which seriously affects the quality and the yield of products.

SUMMARY

According to an aspect of the present disclosure, a display panel is provided in an exemplary embodiment. In such an exemplary embodiment, the display panel comprises: a first substrate and a second substrate arranged oppositely, a light deflection structure arranged between the first substrate and the second substrate, and a black matrix arranged on a side of the second substrate close to the first substrate. Furthermore, the display panel further comprises a display region and a non-display region. The black matrix comprises a light shielding region and a hollowed-out region in the non-display region. An orthogonal projection of the light deflection structure on the first substrate at least covers an orthogonal projection of the hollowed-out region on the first substrate. The light deflection structure is configured to deflect part or all of light incident towards the hollowed-out region to the light-shielding region.

In another exemplary embodiment, the light deflection structure comprises a first deflection layer, a second deflection layer and a third deflection layer arranged sequentially in a direction from the first substrate to the second substrate. Furthermore, a surface of the first deflection layer close to the second substrate comprises a concave recessed into the first deflection layer, and an orthogonal projection of the concave on the first substrate at least covers an orthogonal projection of the hollowed-out region on the first substrate. Besides, the first deflection layer has a greater refractive index than the second deflection layer, and the second deflection layer has a greater refractive index than the third deflection layer.

In another exemplary embodiment, the third deflection layer comprises a solid transparent dielectric layer. Specifically, a surface of the solid transparent dielectric layer close to the second substrate is a plane perpendicular to a thickness direction of the first substrate and in contact with the second substrate.

In another exemplary embodiment, the concave recessed into the first deflection layer comprises a first ramp and a second ramp, the first ramp and the second ramp being symmetric about a midperpendicular plane of a width side of the hollowed-out region.

In another exemplary embodiment, the first ramp satisfies:

$$\begin{cases} d_1 \times \tan(\gamma - \lambda) + d_2 \times \tan\left(\arcsin\left(\frac{n_2 \times \sin(\gamma - \lambda)}{n_3}\right)\right) \geq \frac{S}{2} \\ \gamma = \arcsin\left(\frac{n_1 \times \sin\lambda}{n_2}\right) \end{cases},$$

wherein $\lambda$ indicates an angle enclosed between the first ramp and the first substrate, S indicates a width of the hollowed-out region, $d_1$ indicates a thickness of the second deflection layer, $d_2$ indicates a thickness of the third deflection layer, $n_1$ indicates a refractive index of the first deflection layer, $n_2$ indicates a refractive index of the second deflection layer, and $n_3$ indicates a refractive index of the third deflection layer.

In another exemplary embodiment, the concave recessed into the first deflection layer comprises a circular arc surface, the circular arc surface being symmetric about the midperpendicular plane of the width side of the hollowed-out region.

In another exemplary embodiment, an intersecting arc where the circular arc surface intersects a cross-section of the first deflection layer satisfies:

$$\begin{cases} d_1 \times \tan\left(\gamma - \frac{\delta}{2}\right) + d_2 \times \tan\left(\arcsin\left(\frac{n_2 \times \sin\left(\gamma - \frac{\delta}{2}\right)}{n_3}\right)\right) \geq \frac{S}{2} \\ \gamma = \arcsin\left(\frac{n_1 \times \sin\frac{\delta}{2}}{n_2}\right) \\ T \geq \sqrt{d_1^2 + \left(\frac{S}{2}\right)^2} \end{cases},$$

wherein $2\delta$ indicates a central angle of the intersecting arc, S indicates a width of the hollowed-out region, $d_1$ indicates a thickness of the second deflection layer, $d_2$ indicates a thickness of the third deflection layer, $n_1$ indicates a refractive index of the first deflection layer, $n_2$ indicates a refractive index of the second deflection layer, $n_3$ indicates a refractive index of the third deflection layer, and 2T indicates a length of the intersecting arc.

In another exemplary embodiment, the first deflection layer is formed by at least one of silicon nitride, zinc oxide, titanium oxide, tantalum oxide and zirconium oxide.

In another exemplary embodiment, the second deflection layer comprises a solid transparent dielectric layer, and the solid transparent dielectric layer is formed by at least one of acrylic resin, polyimide resin, polyurethane resin, silicon oxide, aluminum oxide, yttrium oxide and magnesium oxide.

According to another exemplary embodiment, a display device is further provided in embodiments. Specifically, the display device comprises a backlight and any display panel as mentioned above, wherein the backlight is provided on a side of the first substrate away from the second substrate.

BRIEF DESCRIPTION OF DRAWINGS

In order to illustrate the technical solutions in embodiments of the present disclosure more clearly, drawings to be used in the depiction of embodiments will be briefly introduced as follows. Apparently, drawings in the depiction below are only some embodiments of the present disclosure. For a person having ordinary skills in the art, other embodiments can also be obtained from these drawings without any inventive efforts.

FIG. 6 is a diagram illustrating the deflection principle of the light deflection structure comprising the first deflection layer in FIG. 5a.

DETAILED DESCRIPTION OF EMBODIMENTS

The technical solutions in exemplary embodiments of the present disclosure will be described clearly and completely with reference to the drawings illustrating exemplary embodiments of the present disclosure. Obviously, the described exemplary embodiments are only part of embodiments of the present disclosure, instead of all. Based on exemplary embodiments in the present disclosure, all other embodiments obtainable for a person having ordinary skills in the art without any inventive efforts shall fall within the protection scope of the present disclosure.

In the following depiction, various components involved in the display panel and the display device as proposed in the present application will be indicated by the following reference signs respectively: 10—first substrate; 20—second substrate; 201—black matrix; 30—light deflection structure; 301—first deflection layer; 302—second deflection layer; 303—third deflection layer; and 40—sealant.

Figure 1:
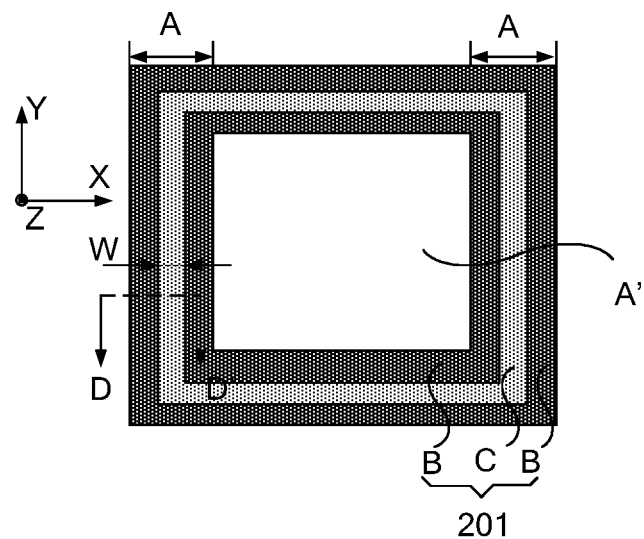
FIG. 1 is a plan view of the display panel according to an embodiment of the present disclosure.
Figure 2:
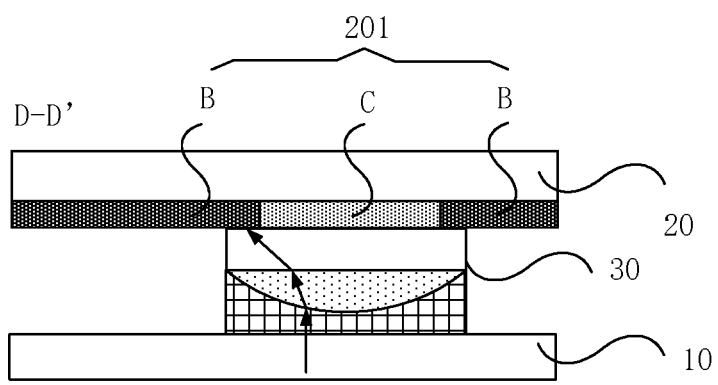
FIG. 2 is a sectional view of the display panel in FIG. 1 taken along line D-D'.

A display panel is provided in an exemplary embodiment of the present disclosure. Referring to FIG. 1 and FIG. 2, a plan view and a sectional view of the display panel according to exemplary embodiments of the present disclosure are shown respectively. To be specific, as shown in FIG. 1, the display panel comprises a display region A' and a non-display region A. Furthermore, as shown in FIG. 2, the display panel comprises a first substrate 10 and a second substrate 20 arranged oppositely, wherein a black matrix 201 is further provided on the second substrate 20. With combined reference to FIG. 1 and FIG. 2, the black matrix 201 comprises a light-shielding region B and a hollowed-out region C in the non-display region A (regions other than the display region A') of the display panel.

Furthermore, as shown in the exemplary embodiment of FIG. 2, the display panel further comprises a light deflection structure 30 arranged between the first substrate 10 and the second substrate 20 and also located in the non-display region A. An orthogonal projection of the light deflection structure 30 on the second substrate 20 at least covers an orthogonal projection of the hollowed-out region C on the second substrate 20. In this way, the light deflection structure 30 can deflect all the light incident towards the hollowed-out region C. In other words, the light deflection structure 30 is configured to deflect part or all of the light incident towards the hollowed-out region C to the light-shielding region B.

It should be noted that in the exemplary embodiment shown by FIG. 2 for example, the second substrate 20 is the light exit side of the display panel. Specifically, light provided by the backlight is emitted out from the second substrate 20 after passing through the first substrate 10. In this exemplary embodiment, since the black matrix 201 is arranged in the non-display region A, it can be used for preventing light emission from the non-display region A, which would otherwise influence the display effect of the display panel. In an embodiment of the present disclosure, no special structure of the backlight is required. As an example, the backlight can be a direct-type backlight. In this case, light provided by the backlight is collimated light. Alternatively, the backlight can also be an edge-type backlight. In this case, after being diffused by a light guide plate, light emitted from a side light source (e.g., an LED) will be emitted out as light oriented upwards. A diffusion range of the light will be narrowed by the collimation restriction of a prism sheet. For light provided by the above backlight, the light deflection structure 30 can deflect light incident towards the hollowed-out region C. In this way, the light can be deflected to the light-shielding region B partially or completely, which avoids light emission from the hollowed-out region C and in turn light leakage of the display panel.

Furthermore, it should be also pointed out that in an exemplary embodiment of the present disclosure, the first substrate 10 and the second substrate 20 may have any suitable structure. For example, the first substrate 10 can be an array substrate, and the second substrate 20 can be a color filter substrate, wherein the black matrix 201 is arranged on the color filter substrate. As another example, the first substrate 10 can be a color-filter on array (COA) substrate, and the COA substrate can be provided with a color filter. In this case, the second substrate 20 can be a counter substrate, and the black matrix 201 is arranged on the counter substrate.

Besides, it should be further noted that as mentioned in the background art, the hollowed-out region C is usually formed by slotting the black matrix 201. Specifically, the hollowed-out region C can be a hollowed-out box as shown in FIG. 1 for example. Obviously, the hollowed-out region C can also comprise discontinuous hollowed-out strips arranged around the display region A', as long as the hollowed-out region C can stop the induced charges from moving towards the display region A'. Furthermore, the direction in which the induced charges move from the non-display region A to the display region A' can be indicated by a width direction of the hollowed-out region C (direction X as shown in FIG. 1), and an extension direction of the hollowed-out region C is direction Y as shown in FIG. 1.

When the hollowed-out region C has a slotting width W (see FIG. 1) smaller than 201 µm, its charge stopping capacity is weaker. Alternatively, when the hollowed-out region C has a slotting width W greater than 50 µm, light leakage caused by the hollowed-out region C will seriously affect the normal display of the display panel. Therefore, advantageously, the slotting width W of the hollowed-out region C can fall in the range of 201 µm-50 µm.

Finally, it should be further pointed out, in an exemplary embodiment of the present disclosure, no special structure for the light deflection structure 30 is required, as long as the light deflection structure 30 can deflect part of the light incident towards the hollowed-out region C to the light-shielding region B. Exemplarily, the light deflection structure 30 can comprise a grating or a refractive dielectric layer.

According to an exemplary embodiment of the present disclosure, a display panel is provided. Specifically, the display panel comprises a first substrate 10 and a second substrate 20 arranged oppositely, wherein a black matrix 201 is provided on the second substrate 20, and the black matrix 201 comprises a light-shielding region B and a hollowed-out region C located in the non-display region A. The display panel further comprises a light deflection structure 30 arranged between the first substrate 10 and the second substrate 20 and also located in the non-display region A, wherein an orthogonal projection of the light deflection structure 30 on the second substrate 20 at least covers an orthogonal projection of the hollowed-out region C on the second substrate 20. In this way, the light deflection structure 30 can completely shield the hollowed-out region C. For example, when light is incident from the first substrate 10 to the second substrate 20, the light deflection structure 30 completely shields the hollowed-out region C, and the light deflection structure 30 can deflect all the light incident towards the black matrix 201, such that part or all of the light incident towards the hollowed-out region C is deflected to the light-shielding region B. In this case, light leakage of the display panel caused by light emission from a hollowed-out region C formed on the black matrix 201 can be improved.

Figure 3:
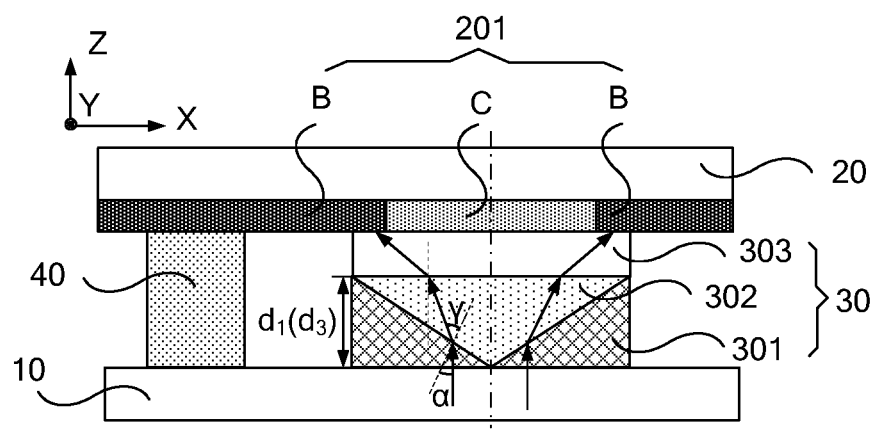
FIG. 3 is a schematic structure view of the display panel according to another embodiment of the present disclosure.

Optionally, as shown in FIG. 3, the light deflection structure 30 comprises a first deflection layer 301, a second deflection layer 302 and a third deflection layer 303 arranged sequentially in a direction from the first substrate 10 to the second substrate 20.

Specifically, a surface of the first deflection layer 301 facing the second substrate 20 (i.e., the upper surface as shown in FIG. 2) comprises a concave portion corresponding to the hollowed-out region C, the concave portion being recessed into the first deflection layer 301 in a direction towards the first substrate 10 for example. That is, the portion of the upper surface of the first deflection layer 301 corresponding to the hollowed-out region C is a concave. Furthermore, the first deflection layer 301 has a greater refractive index than the second deflection layer 302, and the second deflection layer 302 has a greater refractive index than the third deflection layer 303.

It should be noted that in an exemplary embodiment of the present disclosure, a width direction of the light deflection structure 30 is the same as that of the hollowed-out region C, and it refers to a direction in which the induced charges move from the display region A' to the non-display region A (direction X as shown in FIG. 1 or FIG. 3). Besides, a height of the first deflection layer 301 along a direction in which the first substrate 10 points to the second substrate 20 (i.e., direction Z as shown in FIG. 1 or FIG. 3) is namely the thickness of the first deflection layer 301.

Figure 5A:
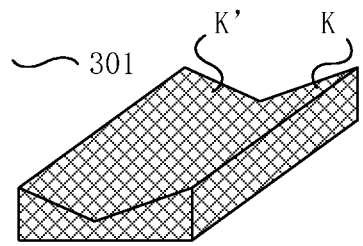
FIGS. 5a and 5b are two schematic structure views of a first deflection layer suitable for use in the display panel of FIG. 3.
Figure 5B:
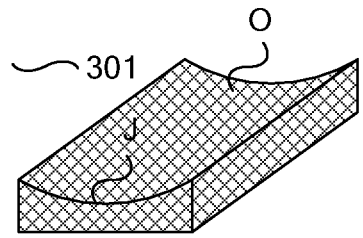

Furthermore, it should be further noted that, in an exemplary embodiment of the present disclosure, a surface of the first deflection layer 301 facing the first substrate 10 (i.e., the upper surface as shown in FIG. 2) comprises a concave portion corresponding to the hollowed-out region C, and the concave portion is recessed into the first deflection layer 301 towards the first substrate 10. Specifically, an orthogonal projection of the concave on the first substrate 10 completely covers an orthogonal projection of the hollowed-out region C on the first substrate 10. Besides, in an exemplary embodiment of the present disclosure, there are no special requirements for other portions of the upper surface of the first deflection layer 301 which are not corresponding to the hollowed-out region C. In order to simplify the manufacture process of the first deflection layer 301, optionally, the surface of the first deflection layer 301 facing the first substrate 10 is a concave. Exemplarily, as shown in FIG. 5a, the concave can be two ramps which are recessed inwards. Alternatively, as shown in FIG. 5b, the concave can also be a circular arc surface which is recessed inwards.

Besides, it should be further pointed out that, as shown in FIG. 3, the third deflection layer 303 can be a dielectric layer added to the original display panel. Exemplarily, the dielectric layer can be usually a solid transparent dielectric layer. Alternatively, the third deflection layer 303 can also be an optical dielectric layer initially existing in the display panel. For example, the liquid crystal display panel comprises a liquid crystal layer, and a portion of the liquid crystal layer located between the second deflection layer 302 and the second substrate 20 can serve as the third deflection layer 303. However, all of the above cases should satisfy the following condition: the refractive index of the second deflection layer 302 is greater than that of the third deflection layer 303.

Figure 4:
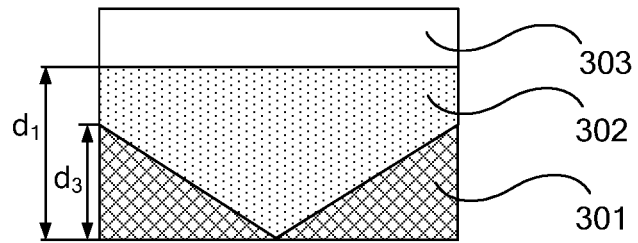
FIG. 4 is a schematic view of a further light deflection structure suitable for use in the display panel of FIG. 3.

Finally, it should be noted that, as shown in FIG. 3, the thickness $d_1$ of the second deflection layer 302 can be equal to the thickness $d_3$ of the first deflection layer 301. Obviously, alternatively, as shown in FIG. 4, the thickness $d_1$ of the second deflection layer 302 can also be greater than the thickness $d_3$ of the first deflection layer 301.

As shown in FIG. 3, when light is incident on the light deflection structure 30, since the refractive index of the first deflection layer 301 is greater than that of the second deflection layer 302, according to the law of refraction $n_1 \sin \alpha = n_2 \sin \gamma$, wherein $n_1 > n_2$, it can be derived $\gamma > \alpha$. As can be seen, light will be deflected for the first time at an interface between the first deflection layer 301 and the second deflection layer 302. Specifically, light will be deflected in a direction towards the light-shielding region B. By the same token, since the refractive index of the second deflection layer 302 is greater than that of the third deflection layer 303, light will be deflected for the second time at an interface between the second deflection layer 302 and the third deflection layer 303. I.e., light will be further deflected in a direction towards the light-shielding region B. By means of the two deflections inside the light deflection structure 30, the propagation direction of light initially incident towards the hollowed-out region C will be changed. Specifically, part or all of the light will be deflected to the light-shielding region B. In this way, light leakage of the display panel caused by light emission from a hollowed-out region C formed on the black matrix 201 can be avoided.

It should be noted that, in all exemplary depictions of the present disclosure, α is used to indicate an incident angle of light incident on the interface between the first deflection layer 301 and the second deflection layer 302, i.e., an angle enclosed between the light and the normal line of the interface, and γ is used to indicate an emergent angle of light emitted out from the interface between the first deflection layer 301 and the second deflection layer 302, i.e., an angle enclosed between the light and the normal line of the interface. Besides, $n_1$ indicates a refractive index of the first deflection layer 301, and $n_2$ indicates a refractive index of the second deflection layer 302.

Furthermore, in order to ensure the deflection effect of light by the light deflection structure 30, when the third deflection layer 303 is a solid transparent dielectric layer added to the original display panel, optionally, an upper surface of the solid transparent dielectric layer (i.e., a surface close to the second substrate 20) is designed as a plane perpendicular to a thickness direction of the first substrate 10 or the second substrate 20. Furthermore, the upper surface of the third deflection layer 303 is further disposed in contact with the second substrate 20.

It should be noted that, in exemplary depictions of the present disclosure, the direction in which the first substrate 10 points to the second substrate 20 (i.e., direction Z as shown in FIG. 1 or FIG. 3) is namely the thickness direction of the first substrate 10.

This means that the upper surface of the third deflection layer 303 is a flat surface perpendicular to the thickness direction of the first substrate 10 or the second substrate 20. In this way, when the upper surface of the third deflection layer 303 is in contact with the second substrate 20, the upper surface of the third deflection layer 303 can be completely adhered to the second substrate 20. This can avoid the presence of further dielectric layers between the third deflection layer 303 and the black matrix 201. The further dielectric layers, if any, will deflect light in an uncontrollable manner such that light will be emitted out from the hollowed-out region C and thus influence the deflection effect by the light deflection structure 30.

Besides, as shown in the exemplary embodiment of FIG. 3, the display panel can further comprise a sealant 40, wherein the first substrate 10 and the second substrate 20 are adhered to each other via the sealant 40 after cell alignment.

A display panel usually has a cell thickness of 3 μm-4 μm. Optionally, the light deflection structure 30 has a thickness of 3 μm-4 μm. Furthermore, the upper surface of the third deflection layer 303 can be disposed in contact with the second substrate 20, after cell alignment between the first substrate 10 and the second substrate 20. In this case, by means of deflection by the light deflection structure 30, light can be directly incident on the light-shielding region B. This ensures the deflection effect by the light deflection structure 30, while avoiding an increased thickness of the display panel 30 due to arrangement of the light deflection structure 30.

Next, the procedure or principle of deflecting part or all of light incident towards the hollowed-out region C to the light-shielding region B by the light deflection structure 30 will be illustrated in detail in combination with the specific structures of the first deflection layer 301, the second deflection layer 302 and the third deflection layer 303.

As shown in FIG. 5a, in an exemplary embodiment, the surface of the first deflection layer 301 facing the second substrate 20 (i.e., the upper surface) comprises a portion corresponding to the hollowed-out region C, e.g., it comprises a first ramp K and a second ramp K' forming a concave portion. Furthermore, the first ramp K and the second ramp K' are symmetric about a midperpendicular plane of a width side of the hollowed-out region C.

It should be noted that the hollowed-out region C has a length side (or an extension direction of the hollowed-out region C) and a width side, both of which have their midperpendicular planes. Those skilled in the art will understand that a midperpendicular plane of a line segment refers to a vertical bisector plane of the line segment. To take the midperpendicular plane of a side in the width direction as an example, the midperpendicular plane will pass through a center of the width side of the hollowed-out region C. In an exemplary embodiment of the present disclosure, the first ramp K and the second ramp K' are symmetric about a midperpendicular plane of the width side of the hollowed-out region C. In this way, an angle enclosed between the first ramp K and the first substrate 10 is equal to an angle enclosed between the second ramp K' and the first substrate 10.

Besides, in this exemplary embodiment, the upper surface of the third deflection layer 303 is flat and in contact with the second substrate 20. The display panel for use in this case has a cross-section as shown in FIG. 6.

In this case, since the refractive index of the first deflection layer 301 is greater than that of the second deflection layer 302 and the refractive index of the second deflection layer 302 is greater than that of the third deflection layer 303, the light deflection structure 30 can deflect twice the light incident towards the hollowed-out region C on the left side or on the right side (corresponding to the first ramp K or the second ramp K' respectively), so as to deflect part or all of the light to the light-shielding region B on the left side or on the right side (close to the first ramp K or the second ramp K' respectively), thereby reducing the probability of light being emitted out from the hollowed-out region C.

As can be seen, when the backlight is a direct-type backlight, light provided by the backlight is vertically incident onto the first substrate 10. In contrast, when the backlight is an edge-type backlight, light provided by the backlight will be diffused in a smaller range. Therefore, light provided by the backlight can be approximately taken as light vertically incident onto the first substrate 10. When the angle enclosed between the first ramp K (or the second ramp K') and the first substrate 10 is constant, the angle enclosed between the light, provided by the backlight and incident on the first ramp K (or the second ramp K'), and the normal line of the first ramp K (or the second ramp K') is constant. This ensures a constant refractive angle of the light emitted out from the interface between the first deflection layer 301 and the second deflection layer 302. Therefore, as long as light incident towards the vicinity of a central position of the hollowed-out region C is deflected to the light-shielding region B, light incident towards the hollowed-out region C on the left side or on the right side (corresponding to the first ramp K or the second ramp K' respectively) can be deflected to the light-shielding region B close to the first ramp K (or the second ramp K') to the maximum degree.

Figure 6:
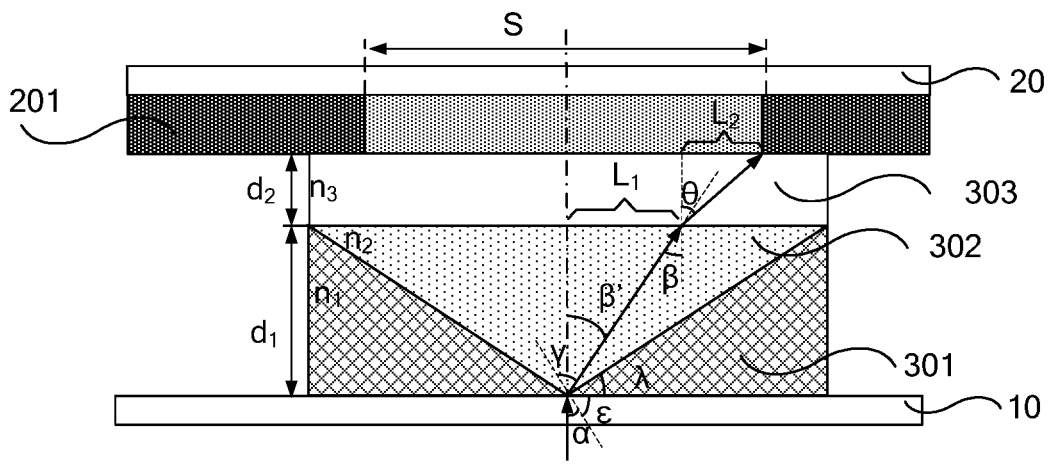

Therefore, in order to deflect as much as possible the light incident towards the hollowed-out region C to the light-shielding region B, optionally, as shown in FIG. 6, the refractive indexes of the first deflection layer 301, the second deflection layer 302 and the third deflection layer 303, and the angle λ enclosed between the first ramp K and the first substrate 10 can be set such that the light incident towards the vicinity of a central position of the hollowed-out region C is at least deflected to an edge of the light-shielding region B.

Specifically, as shown in the exemplary embodiment of FIG. 6, it is assumed that λ indicates an angle enclosed between the first ramp K and the first substrate 10, S indicates a width of the hollowed-out region C, $d_1$, indicates a thickness of the second deflection layer 302, $d_2$ indicates a thickness of the third deflection layer 303, α is an angle enclosed between light incident on an interface between the first deflection layer 301 and the second deflection layer 302 and the normal line of the interface, γ is an angle enclosed between the light emitted out from the interface between the first deflection layer 301 and the second deflection layer 302 and the normal line of the interface, β is an angle enclosed between the light incident on an interface between the second deflection layer 302 and the third deflection layer 303 and the normal line of the interface, and θ is an angle enclosed between the light emitted out from the interface between the second deflection layer 302 and the third deflection layer 303 and the normal line of the interface. As can be seen from FIG. 6, α+ε=90°, and λ+ε=90°, so α=λ.

Firstly, light is deflected for the first time at the interface between the first deflection layer 301 and the second deflection layer 302. Specifically, the incident angle is α, and the emergent angle is γ. According to the law of refraction:

$$n_1 \sin \alpha = n_2 \sin \gamma \quad \text{Formula (1)},$$

It can be derived that $$\gamma = \arcsin\left(\frac{n_1 \times \sin \alpha}{n_2}\right) = \arcsin\left(\frac{n_1 \times \sin \lambda}{n_2}\right),$$

wherein $n_1 > n_2$.

Furthermore, when light is emitted out from the second deflection layer 302 having a thickness of $d_1$, the corresponding horizontal displacement $L_1$ is $L_1 = d_1 \times \tan \beta'$, wherein $\beta' = \gamma - \alpha = \gamma - \lambda$.

Next, light is incident on the interface between the second deflection layer 302 and the third deflection layer 303, wherein the incident angle is β. As can be known from FIG. 6, β=β'. In this case, according to the law of refraction $n_2 \sin \beta = n_3 \sin \theta$, it can be derived that $$\theta = \arcsin\left(\frac{n_2 \times \sin \beta}{n_3}\right) = \arcsin\left(\frac{n_2 \times \sin(\gamma - \lambda)}{n_3}\right), \quad \text{Formula (2)}$$

wherein $n_2 > n_1$.

Then, when light is emitted out from the third deflection layer 303 having a thickness of $d_2$, the corresponding horizontal displacement $L_2$ will be $L_2 = d_2 \times \tan \theta$.

As can be seen from above, light will be deflected after passing through the optical deflection structure 30 composed of the first deflection layer 301, the second deflection layer 302 and the third deflection layer 303. Specifically, the total displacement of light in the horizontal direction is $L = L_1 + L_2$. In order to ensure that light incident towards a central position of the hollowed-out region C is at least deflected to the light-shielding region B, it is required that $$L = L_1 + L_2 \geq \frac{S}{2}. \quad \text{Formula (3)}$$

That is, $$L = d_1 \times \tan(\gamma - \lambda) + d_2 \times \tan\left(\arcsin\left(\frac{n_2 \times \sin(\gamma - \lambda)}{n_3}\right)\right) \geq \frac{S}{2}.$$

To sum up, when the angle λ enclosed between the first ramp K (or the second ramp K') and the first substrate 10 satisfies the above Formulas (1), (2) and (3), light incident towards the vicinity of a central position of the hollowed-out region C can be deflected to the light-shielding region B.

In view of above, according to the law of refraction $n_1 \sin \alpha = n_2 \sin \gamma$, when $n_1$, $n_2$ and α remain constant, the emergent angle γ of light emitted out from the interface between the first deflection layer 301 and the second deflection layer 302 remains constant. By the same token, the emergent angle θ of light emitted out from the interface between the second deflection layer 302 and the third deflection layer 303 remains constant. Since light incident towards a central position of the hollowed-out region C can be deflected to the light-shielding region B, light incident towards the first ramp K (or the second ramp K') and corresponding to the hollowed-out region C can be completely deflected to the light-shielding region B.

In view of above, since the first ramp K and the second ramp K' are symmetric about a midperpendicular plane in a width direction of the hollowed-out region C, an angle enclosed between the second ramp K' and the first substrate 10 is equal to an angle enclosed between the first ramp K and the first substrate 10. The deflection principle of light by the second ramp K' is the same as that by the first ramp K, which will not be repeated herein for simplicity.

Obviously, it is also possible to provide only one ramp on a side of the first deflection layer 301 close to the second substrate 20. That is, the first deflection layer 301 has an asymmetrical uni-ramp structure. In this case, the angle enclosed between the ramp and the first substrate 10 can be determined based on the refractive indexes and the thicknesses of the first deflection layer 301 and the second deflection layer 302. The principle thereof is also the same, and will not be repeated herein for simplicity.

As shown in FIG. 5b, in another exemplary embodiment of the present disclosure, a surface of the first deflection layer 301 facing the second substrate 20 (i.e., the upper surface) comprises a circular arc surface O corresponding to the hollowed-out region C. Specifically, the circular arc surface O is symmetric about a midperpendicular plane of a width side of the hollowed-out region C. For example, the circular arc surface O and a cross-section of the first deflection layer 301 have an intersecting circular arc J.

It should be noted that the circular arc surface O being symmetric about a midperpendicular plane of a width side of the hollowed-out region C means that a center of the intersecting arc J (i.e., the intersecting circular arc) is located on the midperpendicular plane of the width side.

Besides, in this exemplary embodiment, the upper surface of the third deflection layer 303 is flat and in contact with the second substrate 20. The display panel for use in this case has a cross-section as shown in FIG. 7.

In this case, since the first deflection layer 301 has a greater refractive index than the second deflection layer 302, and the second deflection layer 302 has a greater refractive index than the third deflection layer 303, the light deflection structure 30 can deflect twice the light incident towards the hollowed-out region C. As a result, part or all of the light is deflected to the light-shielding region B, which reduces the probability of light being emitted out from the hollowed-out region C.

Figure 7:
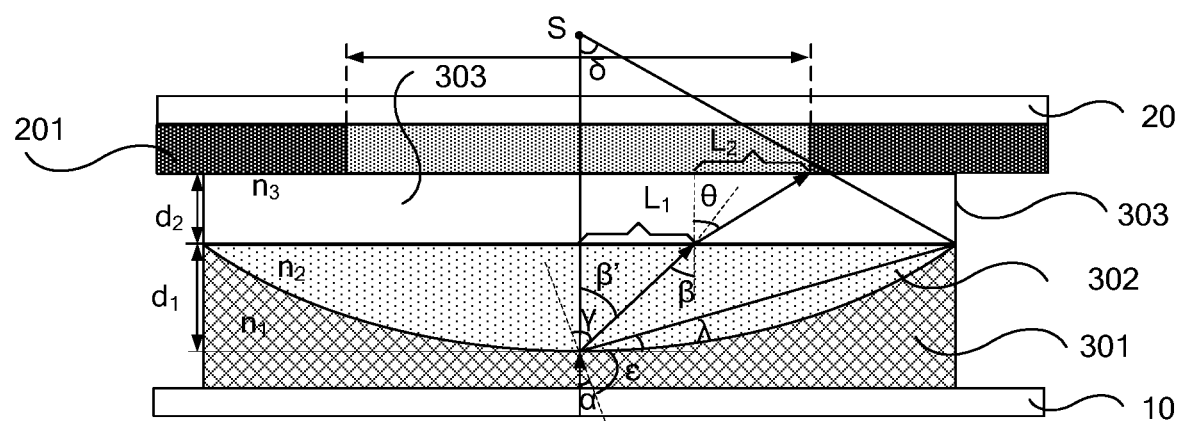
FIG. 7 is a diagram illustrating the deflection principle of the light deflection structure comprising the first deflection layer in FIG. 5b.

Furthermore, in order to deflect as much as possible the light incident towards the hollowed-out region C to the light-shielding region B and thus reduce the probability of light leakage of the display panel caused by the hollowed-out region C, optionally, as shown in FIG. 7, the refractive indexes of the first deflection layer 301, the second deflection layer 302 and the third deflection layer 303, and the curvature radius of the intersecting arc J can be set such that the light incident towards the vicinity of a central position of the hollowed-out region C is at least deflected to an edge of the light-shielding region B.

Specifically, as shown in the exemplary embodiment of FIG. 7, the intersecting arc J is symmetric about a central plane in an extension direction of the hollowed-out region C, wherein δ is used to indicate a circular angle corresponding to half of the intersecting arc J. Specifically, δ=180°−2× (90°−α)=2α, i.e., $$\lambda = \frac{\delta}{2}.$$

As can be seen from FIG. 7, α+ε=90°, and λ+ε=90%, so α=λ.

In this exemplary embodiment, a length T for half of the intersecting arc J can be approximately regarded as equal to a length of its corresponding chord. According to FIG. 7, $$T \geq \sqrt{d_1^2 + \left(\frac{S}{2}\right)^2}.$$

It should be pointed out that a tangent of the intersecting arc J at a central position of the hollowed-out region C can be approximately regarded as the chord.

As an example, light is deflected for the first time at the interface between the first deflection layer 301 and the second deflection layer 302, wherein the incident angle is α, and the emergent angle is γ. According to the law of refraction:

$$n_1 \sin \alpha = n_2 \sin \gamma \quad \text{Formula (1),}$$

It can be derived that $$\gamma = \arcsin\left(\frac{n_1 \times \sin \alpha}{n_2}\right) = \arcsin\left(\frac{n_1 \times \sin \lambda}{n_2}\right),$$

wherein $n_1 > n_2$.

After that, when light is emitted out from the second deflection layer 302 having a thickness of $d_1$, the corresponding horizontal displacement $L_1$ is $L_1 = d_1 \times \tan \beta'$, wherein $\beta' = \gamma - \alpha = \gamma - \lambda$.

Next, light is incident on the interface between the second deflection layer 302 and the third deflection layer 303, wherein the incident angle is β. As can be known from FIG. 7, β=β'. Furthermore, according to the law of refraction, $n_2 \sin \beta = n_3 \sin \theta$, it can be derived that $$\theta = \arcsin\left(\frac{n_2 \times \sin \beta}{n_3}\right) = \arcsin\left(\frac{n_2 \times \sin(\gamma - \lambda)}{n_3}\right), \quad \text{Formula (2)}$$

wherein $n_2 > n_3$.

Then, when light is emitted out from the third deflection layer 303 having a thickness $d_2$, the corresponding horizontal displacement $L_2$ will be $L_2 = d_2 \times \tan \theta$.

As can be seen from above, light will be deflected after passing through the optical deflection structure 30 composed of the first deflection layer 301, the second deflection layer 302 and the third deflection layer 303. For example, the total displacement of light in the horizontal direction is $L = L_1 + L_2$. In order to ensure that light incident towards a central position of the hollowed-out region C is at least deflected to the light-shielding region B, it is required that $$L = L_1 + L_2 \geq \frac{S}{2}. \quad \text{Formula (3)}$$

That is, $$L = d_1 \times \tan(\gamma - \lambda) + d_2 \times \tan\left(\arcsin\left(\frac{n_2 \times \sin(\gamma - \lambda)}{n_3}\right)\right) \geq \frac{S}{2}.$$

Furthermore, since $$\lambda = \frac{\delta}{2},$$

it can be derived that:

$$d_1 \times \tan\left(\gamma - \frac{\delta}{2}\right) + d_2 \times \tan\left(\arcsin\left(\frac{n_2 \times \sin\left(\gamma - \frac{\delta}{2}\right)}{n_3}\right)\right) \geq \frac{S}{2}.$$

To sum up, when the intersecting arc J (specifically, the circular arc) where the circular arc surface O intersects a cross-section of the first deflection layer 301 satisfies the above Formulas (1), (2) and (3) at the same time, light incident towards the vicinity of a central position of the hollowed-out region C can be deflected to the light-shielding region B. According to the law of arc length, the arc length=the radius of the circular arc×the central angle corresponding to the circular arc. Therefore, when the central angle and the arc length corresponding to the central angle are known, the curvature radius of the circular arc (i.e., the intersecting arc J) can be known as well.

Furthermore, according to the law of refraction $n_1 \sin \alpha = n_2 \sin \gamma$, when $n_1$, $n_2$ and α remain constant, the emergent angle γ of light emitted out from the interface between the first deflection layer 301 and the second deflection layer 302 remains constant. By the same token, the emergent angle 9 of light emitted out from the interface between the second deflection layer 302 and the third deflection layer 303 remains constant. Since light incident towards a central position of the hollowed-out region C can be deflected to the light-shielding region B, light incident towards the circular arc surface O and corresponding to the hollowed-out region C can be completely deflected to the light-shielding region B.

It should be noted that, in an exemplary embodiment of the present disclosure, the first deflection layer 301 and the second deflection layer 302 can be formed by using any suitable material. As an example, the first deflection layer 301 and the second deflection layer 302 can be made of an inorganic medium or organic resin. When they are made of an inorganic medium, the ramp or the circular arc surface can be fabricated by a physical vapor deposition process or a chemical vapor deposition process. For example, it can be fabricated by techniques such as vacuum evaporation, ion beam-assisted deposition and ion etching. When they are made of organic resin, the first deflection layer 301 having the above ramp or circular arc surface can be fabricated by lithography through adjustment of the exposure amount of the mask plate. It should be noted that the above fabrication processes are all conventional processes for forming a display panel, which can be used together with a device for implementing the above fabrication processes so as to form the first deflection layer 301.

In another exemplary embodiment, the material for forming the first deflection layer 301 can be at least one of silicon nitride (n=2.1), zinc oxide (n=2.0), titanium oxide (n=2.35), tantalum oxide (n=2.1) and zirconium oxide (n=2.05). The material for forming the second deflection layer 302 can be at least one of acrylic resin, polyimide resin, polyurethane resin (n=1.5-n=1.7), silicon oxide (n=1.46), aluminum oxide (n=1.6), yttrium oxide (n=1.8) and magnesium oxide (n=1.7). Obviously, the above materials are only used for exemplarily illustrating the light deflection structure 30 provided in embodiments of the present disclosure and should never be considered as limiting the material for forming the light deflection structure 30.

In order to reduce the material cost for fabricating the light deflection structure 30 in a exemplary embodiment, the first deflection layer 301 and the second deflection layer 302 can be formed by using a same material. For example, the first deflection layer 301 and the second deflection layer 302 can be both one of acrylic resin, polyimide resin, polyurethane resin or the like. Specifically, the second deflection layer 302 can be formed directly by using the above material. Then, when the first deflection layer 301 is formed by using the above material, additives and functional groups (e.g., S, halides, metals), or nano-doped materials (e.g., $TiO_2$, $ZrO_2$, ZnO), can be added as well to the above material to adjust (e.g., increase) the refractive index thereof.

Furthermore, the first deflection layer 301, the second deflection layer 302 and the third deflection layer 303 can absorb light to a certain extent. Therefore, the probability of light being emitted out from the hollowed-out region C can be reduced.

As an example, it is assumed that the width S of the hollowed-out region C is 20 μm, the first deflection layer 301 is made of zirconium oxide ($n_1$=2.35), the second deflection layer 302 is made of resin ($n_2$=1.7), the thickness $d_1$ of the second deflection layer 302 is 2 μm, the third deflection layer 303 is made of magnesium fluoride ($n_3$=1.38), and the thickness $d_2$ of the third deflection layer 303 is 1 μm. The deflection of part or all of light incident towards the hollowed-out region C by the light deflection structure 30, e.g., to the light-shielding region B, will be illustrated below in details in this case. In an embodiment of the present disclosure, exemplarily, the maximum deflection angle of the incident light by the first deflection layer 301 is a total reflection critical angle.

Firstly, light is deflected for the first time at the interface between the first deflection layer 301 and the second deflection layer 302, wherein the incident angle α (i.e., the tilt angle λ of the ramp) is $$\alpha = \arctan\left(\frac{n_2}{n_1}\right).$$

Thereby, it can be calculated that α=36°, and the emergent angle is γ=90°. In this case, the incident angle β of light incident on the second deflection layer 302 is β=90°−36°=54°. After that, when light is emitted out from the second deflection layer 302 having a thickness of $d_1$, the corresponding horizontal displacement $L_1$ is $L_1=d_1\times\tan \beta'=2\times\tan(90°−36°)$=2.75 μm.

Next, light is incident on the interface between the second deflection layer 302 and the third deflection layer 303, wherein the incident angle is β=γ−α=90°−36°=54°. According to the law of refraction, $n_2 \sin \beta = n_3 \sin \theta$, it can be calculated that θ=85°. Then, when light is emitted out from the third deflection layer 303 having a thickness of $d_2$, the corresponding horizontal displacement $L_2$ is $L_2=d_2\times\tan \theta=1\times\tan 85°$=11.43 μm.

As can be seen from the above examples, light will have a total displacement of $L=L_1+L_2$=2.75+11.43=14.18>10 (μm) in the horizontal direction after passing through the optical deflection structure 30 composed of the first deflection layer 301, the second deflection layer 302 and the third deflection layer 303. So, the light incident towards a central position of the hollowed-out region C can be deflected to the light-shielding region B.

It should be noted that a plurality of repetitive optical deflection structures 30 can be arranged, wherein each of them comprises the first deflection layer 301, the second deflection layer 302 and the third deflection layer 303. In this case, deflection of light can be achieved by selecting a suitable material and a suitable thickness.

Besides, when the light deflection structure 30 is formed in the display panel, the concave angle of the first deflection layer 301 can be adjusted, and the total reflection principle can be utilized such that light is not emitted out from the hollowed-out region C. As an example, the first deflection layer 301 has a first ramp K and a second ramp K', and the angle enclosed between the first ramp K and the first substrate 10 is arranged to be equal to the total reflection critical angle. In this case, the incident angle of light incident on the interface between the first deflection layer 301 and the second deflection layer 302 is equal to a total reflection critical angle. As a result, light cannot be emitted out from the first deflection layer 301, which avoids light leakage of the display panel caused by light emission from the hollowed-out region C.

In an exemplary embodiment, the light deflection structure 30 can further comprise a first deflection layer 301, a second deflection layer 302 and a third deflection layer 303 arranged sequentially along a direction in which the first substrate 10 points to the second substrate 20.

Furthermore, a surface of the first deflection layer facing the second substrate 20 is convex, i.e., the surface protrudes towards the second substrate 20 (instead of the first substrate 10). In this case, the first deflection layer 301 has a smaller refractive index than the second deflection layer 302, and the second deflection layer 302 has a smaller refractive index than the third deflection layer 303.

In this case, the specific structures of the first deflection layer 301, the second deflection layer 302 and the third deflection layer 303 can be flexibly selected upon different refractive indexes and different thicknesses, and the present disclosure is not limited in this aspect, as long as part or all of the light incident towards the hollowed-out region C can be deflected to the light-shielding region B after passing through the first deflection layer 301, the second deflection layer 302 and the third deflection layer 303.

An exemplary embodiment of the present disclosure further provides a display device. Specifically, the display device comprises a backlight and any display panel as mentioned above, wherein the backlight is provided on a side of the first substrate 10 facing away from the second substrate 20.

In view of above, when light provided by the backlight is incident from the first substrate 10 to the second substrate 20, the light deflection structure 30 can deflect part or all of light incident towards the hollowed-out region C of the black matrix 201 to the light-shielding region B. In this way, the probability of light leakage of the display panel caused by light emission from the hollowed-out region C can be reduced.

The above descriptions are only exemplary embodiments of the present disclosure, but the protection scope of the present disclosure is not limited thereto. Any variation or substitution easily conceivable within the technical scope disclosed in the present disclosure for a skilled person, who is familiar with this technical field, shall fall within the protection scope of the present disclosure. Therefore, the protection scope of the present disclosure shall be subject to the protection scope of the claims.

The invention claimed is:

1. A display panel, comprising:
a first substrate and a second substrate opposite to each other,
a light deflection structure between the first substrate and the second substrate, and
a black matrix on a side of the second substrate close to the first substrate, wherein the display panel further comprises a display region and a non-display region, the black matrix comprises a light shielding region and a hollowed-out region in the non-display region,
an orthogonal projection of the light deflection structure on the first substrate completely covers an orthogonal projection of the hollowed-out region on the first substrate, and the light deflection structure is configured to deflect part or all of light incident towards the hollowed-out region to the light-shielding region.

2. The display panel according to claim 1, wherein
the light deflection structure comprises a first deflection layer, a second deflection layer and a third deflection layer arranged sequentially in a direction from the first substrate to the second substrate,
a surface of the first deflection layer close to the second substrate comprises a concave recessed into the first deflection layer, wherein an orthogonal projection of the concave on the first substrate at least covers an orthogonal projection of the hollowed-out region on the first substrate, and
the first deflection layer has a greater refractive index than the second deflection layer, while the second deflection layer has a greater refractive index than the third deflection layer.

3. The display panel according to claim 2, wherein
the third deflection layer comprises a solid transparent dielectric layer, and a surface of the solid transparent dielectric layer close to the second substrate is a plane perpendicular to a thickness direction of the first substrate and in contact with the second substrate.

4. The display panel according to claim 2, wherein
the concave comprises a first ramp and a second ramp, the first ramp and the second ramp being symmetric about a midperpendicular plane of a width side of the hollowed-out region.

5. The display panel according to claim 4, wherein
the first ramp satisfies:

$$\begin{cases} d_1 \times \tan(\gamma - \lambda) + d_2 \times \tan\left(\arcsin\left(\frac{n_2 \times \sin(\gamma - \lambda)}{n_3}\right)\right) \geq \frac{S}{2} \\ \gamma = \arcsin\left(\frac{n_1 \times \sin \lambda}{n_2}\right) \end{cases},$$

wherein $\lambda$ indicates an angle between the first ramp and the first substrate, S indicates a width of the hollowed-out region, $d_1$ indicates a thickness of the second deflection layer, $d_2$ indicates a thickness of the third deflection layer, $n_1$ indicates a refractive index of the first deflection layer, $n_2$ indicates a refractive index of the second deflection layer, and $n_3$ indicates a refractive index of the third deflection layer.

6. The display panel according to claim 2, wherein
the concave comprises a circular arc surface which is symmetric about the midperpendicular plane of the width side of the hollowed-out region.

7. The display panel according to claim 6, wherein
an intersecting arc where the circular arc surface intersects a cross-section of the first deflection layer satisfies:

$$\begin{cases} d_1 \times \tan\left(\gamma - \frac{\delta}{2}\right) + d_2 \times \tan\left(\arcsin\left(\frac{n_2 \times \sin\left(\gamma - \frac{\delta}{2}\right)}{n_3}\right)\right) \geq \frac{S}{2} \\ \gamma = \arcsin\left(\frac{n_1 \times \sin \frac{\delta}{2}}{n_2}\right) \\ T \geq \sqrt{d_1^2 + \left(\frac{S}{2}\right)^2} \end{cases},$$

wherein $2\delta$ indicates a central angle of the intersecting arc; S indicates a width of the hollowed-out region, $d_1$ indicates a thickness of the second deflection layer, $d_2$ indicates a thickness of the third deflection layer, $n_1$ indicates a refractive index of the first deflection layer, $n_2$ indicates a refractive index of the second deflection layer, $n_3$ indicates a refractive index of the third deflection layer, and 2T indicates a length of the intersecting arc.

8. The display panel according to claim 2, wherein
the first deflection layer is formed by at least one of silicon nitride, zinc oxide, titanium oxide, tantalum oxide and zirconium oxide.

9. The display panel according to claim 2, wherein
the second deflection layer comprises a solid transparent dielectric layer, and the solid transparent dielectric layer is formed by at least one of acrylic resin, polyimide resin, polyurethane resin, silicon oxide, aluminum oxide, yttrium oxide and magnesium oxide.

10. A display device, comprising:
a backlight, and
the display panel according to claim 1, wherein
the backlight is located on a side of the first substrate away from the second substrate.

11. The display panel according to claim 3, wherein
the concave comprises a first ramp and a second ramp, the first ramp and the second ramp being symmetric about a midperpendicular plane of a width side of the hollowed-out region.

12. The display panel according to claim 3, wherein
the concave comprises a circular arc surface which is symmetric about the midperpendicular plane of the width side of the hollowed-out region.

13. The display device according to claim 10, wherein
the light deflection structure comprises a first deflection layer, a second deflection layer and a third deflection layer arranged sequentially in a direction from the first substrate to the second substrate,
a surface of the first deflection layer close to the second substrate comprises a concave recessed into the first deflection layer, wherein an orthogonal projection of the concave on the first substrate at least covers an orthogonal projection of the hollowed-out region on the first substrate, and
the first deflection layer has a greater refractive index than the second deflection layer, while the second deflection layer has a greater refractive index than the third deflection layer.

14. The display device according to claim 13, wherein
the third deflection layer comprises a solid transparent dielectric layer, and a surface of the solid transparent dielectric layer close to the second substrate is a plane perpendicular to a thickness direction of the first substrate and in contact with the second substrate.

15. The display device according to claim 13, wherein
the concave comprises a first ramp and a second ramp, the first ramp and the second ramp being symmetric about a midperpendicular plane of a width side of the hollowed-out region.

16. The display device according to claim 15, wherein
the first ramp satisfies:

$$\begin{cases} d_1 \times \tan(\gamma - \lambda) + d_2 \times \tan\left(\arcsin\left(\frac{n_2 \times \sin(\gamma - \lambda)}{n_3}\right)\right) \geq \frac{S}{2} \\ \gamma = \arcsin\left(\frac{n_1 \times \sin\lambda}{n_2}\right) \end{cases},$$

wherein $\lambda$ indicates an angle between the first ramp and the first substrate, S indicates a width of the hollowed-out region, $d_1$ indicates a thickness of the second deflection layer, $d_2$ indicates a thickness of the third deflection layer, $n_1$ indicates a refractive index of the first deflection layer, $n_2$ indicates a refractive index of the second deflection layer, and $n_3$ indicates a refractive index of the third deflection layer.

17. The display device according to claim 13, wherein
the concave comprises a circular arc surface which is symmetric about the midperpendicular plane of the width side of the hollowed-out region.

18. The display device according to claim 17, wherein
an intersecting arc where the circular arc surface intersects a cross-section of the first deflection layer satisfies:

$$\begin{cases} d_1 \times \tan\left(\gamma - \frac{\delta}{2}\right) + d_2 \times \tan\left(\arcsin\left(\frac{n_2 \times \sin\left(\gamma - \frac{\delta}{2}\right)}{n_3}\right)\right) \geq \frac{S}{2} \\ \gamma = \arcsin\left(\frac{n_1 \times \sin\frac{\delta}{2}}{n_2}\right) \\ T \geq \sqrt{d_1^2 + \left(\frac{S}{2}\right)^2} \end{cases},$$

wherein $2\delta$ indicates a central angle of the intersecting arc; S indicates a width of the hollowed-out region, $d_1$ indicates a thickness of the second deflection layer, $d_2$ indicates a thickness of the third deflection layer, $n_1$ indicates a refractive index of the first deflection layer, $n_1$ indicates a refractive index of the second deflection layer, $n_3$ indicates a refractive index of the third deflection layer, and 2T indicates a length of the intersecting arc.

19. The display device according to claim 13, wherein
the first deflection layer is formed by at least one of: silicon nitride, zinc oxide, titanium oxide, tantalum oxide and zirconium oxide.

20. The display device according to claim 13, wherein
the second deflection layer comprises a solid transparent dielectric layer, and the solid transparent dielectric layer is formed by at least one of: acrylic resin, polyimide resin, polyurethane resin, silicon oxide, aluminum oxide, yttrium oxide and magnesium oxide.

\* \* \* \* \*

UNITED STATES PATENT AND TRADEMARK OFFICE
CERTIFICATE OF CORRECTION

PATENT NO. : 10,884,281 B2  
APPLICATION NO. : 16/327916  
DATED : January 5, 2021  
INVENTOR(S) : Zhang et al.

Page 1 of 1

It is certified that error appears in the above-identified patent and that said Letters Patent is hereby corrected as shown below:

On the Title Page

Please correct the first name of the Assignee item (73) to read as follows:  
HEFEI BOE OPTOELECTRONICS TECHNOLOGY CO., LTD., Anhui (CN)

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*